United States Patent
Kojima

(10) Patent No.: US 6,840,262 B2
(45) Date of Patent: Jan. 11, 2005

(54) FUEL BLOCKING VALVE DEVICE

(75) Inventor: Takeshi Kojima, Machida (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/444,641

(22) Filed: May 27, 2003

(65) Prior Publication Data

US 2004/0025937 A1 Feb. 12, 2004

(30) Foreign Application Priority Data

Aug. 7, 2002 (JP) ........................................ 2002-229505

(51) Int. Cl.[7] ............................................. F16K 24/04
(52) U.S. Cl. ....................... 137/202; 137/39; 137/493.2
(58) Field of Search ........................ 137/39, 202, 493.1, 137/493.2, 493.8, 493.9

(56) References Cited

U.S. PATENT DOCUMENTS

| | | | |
|---|---|---|---|
| 4,378,815 A | * | 4/1983 | Mochida et al. ......... 137/493.2 |
| 5,666,989 A | * | 9/1997 | Roetker ....................... 137/202 |
| 6,164,320 A | * | 12/2000 | Hamano et al. .......... 137/493.2 |
| 2004/0007262 A1 | * | 1/2004 | Hattori ........................ 137/202 |
| 2004/0011401 A1 | * | 1/2004 | Kato ........................... 137/202 |

* cited by examiner

Primary Examiner—Gerald A. Michalsky
(74) Attorney, Agent, or Firm—Manabu Kanesaka

(57) ABSTRACT

A fuel blocking valve device includes a housing attached to a fuel tank of a vehicle and having a communication path between an inside and an outside of the fuel tank, a float valve for closing the communication path when fuel flows into the housing, and a two-way valve disposed above the float vale for opening and closing according to an inner pressure of the tank. The two-way valve opens and closes according to a difference between the inner pressure of the fuel tank and an atmospheric pressure. Further, the two-way valve includes a valve member for opening when the vehicle runs and vibrates. The valve member is formed of a spherical member and a cone shape valve seat for opening the communication path when the inner pressure of the fuel tank exceeds a predetermined high level.

8 Claims, 5 Drawing Sheets

FUEL BLOCKING VALVE DEVICE

BACKGROUND OF THE INVENTION AND RELATED ART STATEMENT

The invention relates to a fuel blocking valve device for closing a path between a fuel tank and a canister to prevent fuel from leaking when a vehicle turns over.

FIG. 4 is a schematic view showing a fuel system between a fuel tank 1 of a vehicle and a canister 2. In the drawing, on the upper portion of the tank 1, there are provided a vent valve device 5 and a blocking valve device (cut-off valve) 10 connected to the canister 2 directly by a piping 3 or through a differential pressure regulating valve 8; a pump module 4 for supplying fuel in the tank through a carburetor fuel pipe 4a; and a connecting portion and an electric system connector (not shown) of a return pipe for returning the fuel from the carburetor. Reference numeral 6 represents a fuel supply pipe, and an upper portion of the fuel supply pipe 6 and the differential pressure regulating valve 8 are connected by a piping.

The vent valve 5 is opened to discharge the fuel vapor in the tank to the canister 2 through the differential pressure regulating valve 8 when only a small amount of the fuel remains in the tank 1. When the fuel is supplied to the tank 1, the valve is closed to block the discharge of the fuel vapor. The blocking valve device 10 recovers the fuel vapor generated in the tank 1 at the canister, or prevents the fuel in the tank 1 from flowing out through the canister 2 when the vehicle turns over.

FIG. 5 is a sectional view showing the conventional blocking valve device disclosed in Japanese Patent Publication (KOKAI) No. 10-47184. The valve device 50 includes a housing 51 mounted on an upper side of the fuel tank 1 through a supporting member 52; a float valve 54 for floating to close a path communicating between an inside of the fuel tank and an outside thereof when the fuel flows into the housing; and a two-way valve 64 for opening and closing the path according to an increase or decrease in an inner pressure of the tank 1.

The housing 51 is provided with a lower chamber 53b and an upper chamber 53a divided by a valve seat 55. A float valve 54 has a valve member 56 disposed in the lower chamber 53b in a state (open state) that a spring 57 urges the valve member upward. The valve member floats when the fuel flows into the lower chamber 53b, and enters an inclined hole of a valve seat center hole 55a to become a closed position.

The two-way valve 64 includes an umbrella shape valve member 58 (having an umbrella valve 60 for a negative pressure disposed to be movable vertically) for abutting against a recessed seat portion 55b located at an upper surface of the valve seat 55 to open or close a center hole 55a; and a spring 59 for urging the valve member 58 toward a closed position.

In an operation of the valve described above, the valve member 58 is normally located at the closed position. When the inner pressure of the tank exceeds a predetermined value, the inner pressure pushes the valve member 58 to the open position against the spring 59, thereby releasing the high-pressure vapor in the fuel tank to the canister 2. When the interior of the tank becomes cool and a negative pressure, the umbrella valve 60 slides downward with respect to the valve member 58 to open the valve, thereby introducing air into the tank to release the negative pressure state.

Thus, in the valve device 50, the float valve 54 prevents the fuel from leaking when the vehicle turns over, and the two-way valve 64 controls the inner pressure of the tank.

In a case that the tank is made of a resin, a small amount of fuel vapor in the tank 1 permeates through welded portions such as attaching portions of the valve device 50 and a pump module to leak into the atmosphere. In a case that the tank is made of metal, the fuel vapor in the tank 1 permeates into the atmosphere through an introduction grommet portion of a return pipe and the like. Although the quantity of the leaked fuel vapor is extremely small, a more stringent limit value has been required in a regulation.

However, the two-way valve 64 in the conventional valve device 50 opens or closes only when the inner pressure of the tank exceeds or becomes below a predetermined value. Therefore, it is difficult to maintain the inner pressure of the tank close to the atmospheric pressure. Accordingly, the fuel vapor leaks corresponding to the situation that the inner pressure of the tank 1 becomes higher than the atmospheric pressure.

In view of the above problems, the present invention has been made, and an object of the invention is to provide a fuel blocking valve device for maintaining the inner pressure of the tank at a value close to the atmospheric pressure, thereby preventing a large amount of the fuel vapor from leaking.

Further objects and advantages of the invention will be apparent from the following description of the invention.

SUMMARY OF THE INVENTION

To attain the above objects, according to the first aspect of the present invention, a fuel blocking valve device includes a housing attached to a fuel tank of a vehicle and having a communication path between an inside and an outside of the fuel tank; a float valve for floating to close the communication path when fuel flows into the housing; and a two-way valve disposed above the float vale for opening and closing according to an inner pressure of the tank. The two-way valve opens and closes according to a difference between the inner pressure of the fuel tank and an atmospheric pressure. Further, the two-way valve includes a valve member for opening when the vehicle runs and vibrates.

According to the valve device as described above, the two-way valve repeats opening-closing operations when the vehicle runs and vibrates. Air enters the fuel tank when the two-way valve opens, so that the inner pressure of the tank is maintained very close to the atmospheric pressure. Therefore, it is possible to reduce an amount of fuel vapor passage through the attaching portions due to the inner pressure in the fuel tank, as opposed to a conventional valve device.

According to the second aspect of the invention, it is preferable that the two-way valve includes a positive pressure valve member formed of a spherical member and a cone shape valve seat. The positive pressure valve opens when the spherical member rolls. The spherical member is arranged to roll easily along a cone shape surface of the valve seat. Thus, the positive pressure valve member repeats opening and closing while the vehicle runs and vibrates, and the valve is closed as soon as the vehicle stops.

According to the third aspect of the invention, the two-way valve further includes a negative pressure valve member. A valve member of the negative pressure valve member is integrated with the valve seat of the positive pressure valve. Further, the spherical member of the positive pressure valve is disposed in a space formed between the valve member of the negative pressure valve member and the valve seat of the positive pressure valve member. Thus, it is possible to make the positive pressure valve member and the negative pressure valve member small, thereby making it easy to dispose them in the housing.

According to the fourth aspect of the invention, the positive pressure valve opens at a pressure higher than a head pressure of a fuel supply pipe when the fuel tank is full. Thus, it is possible to prevent a problem in which the spherical member of the positive pressure valve inadvertently opens due to the inner pressure of the tank when the fuel tank is full.

DETAILED DESCRIPTION OF PREFERRED EMBODIMENTS

Figure 1:
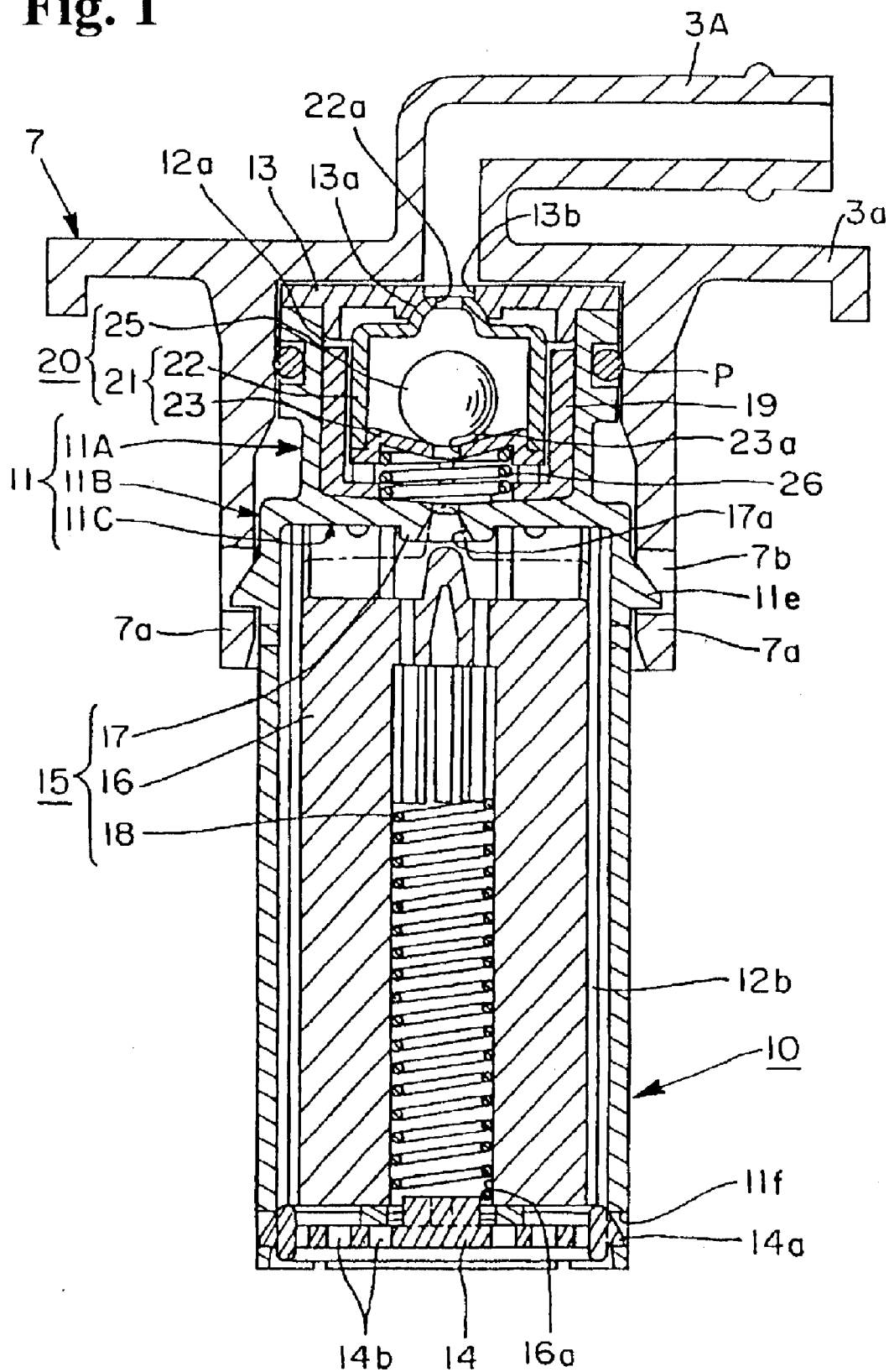
FIG. 1 is a sectional view showing a valve device according to the first embodiment of the invention.
Figure 2A:
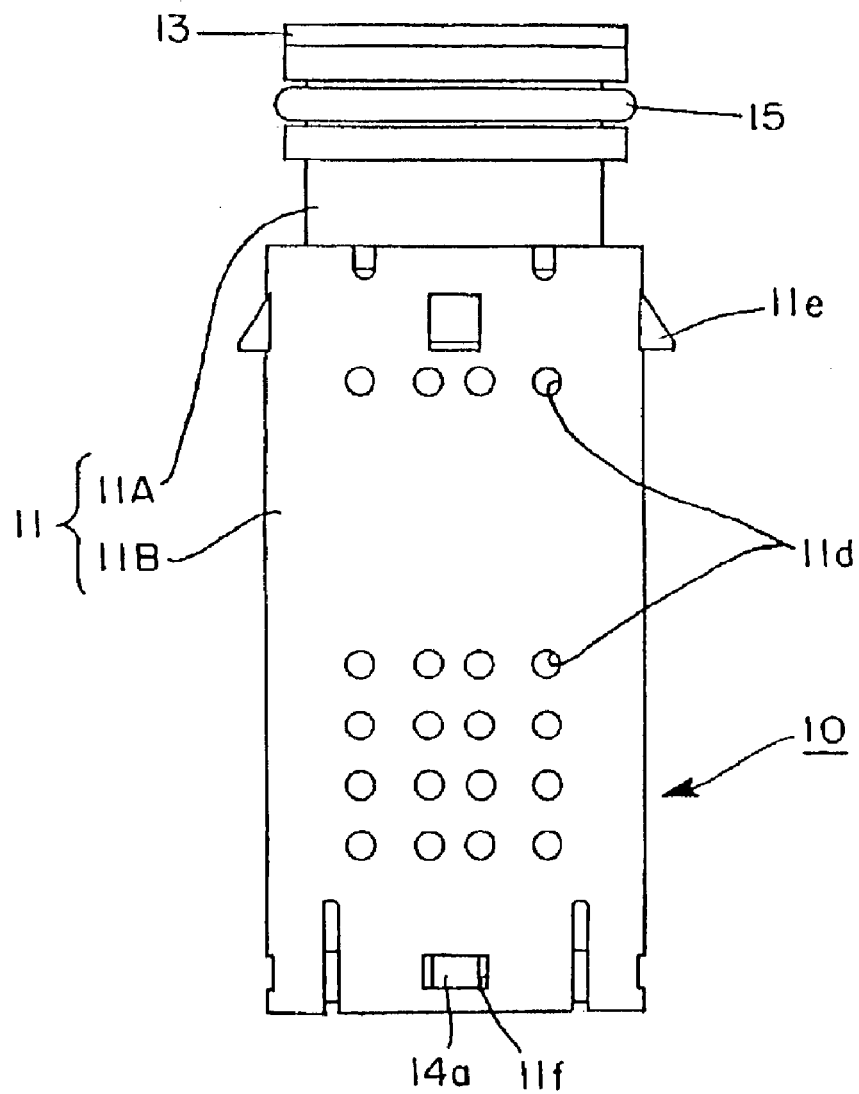
FIG. 2(a) is a view showing an appearance of the valve device in FIG. 1.
Figure 2B:
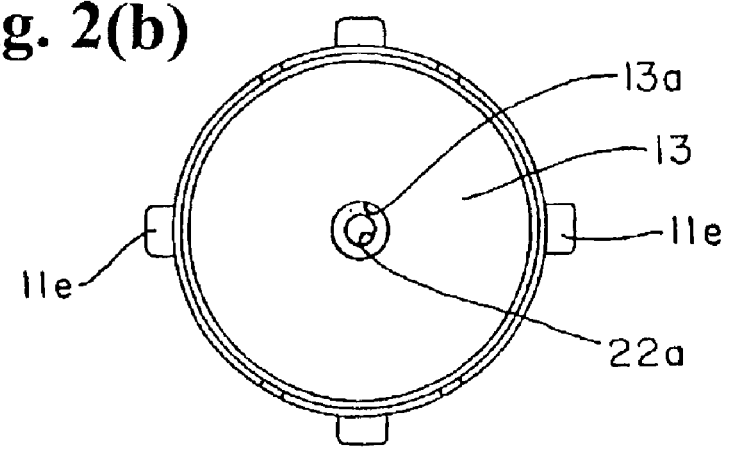
FIG. 2(b) is a view showing an upper part of the valve device in FIG. 1.
Figure 3A:
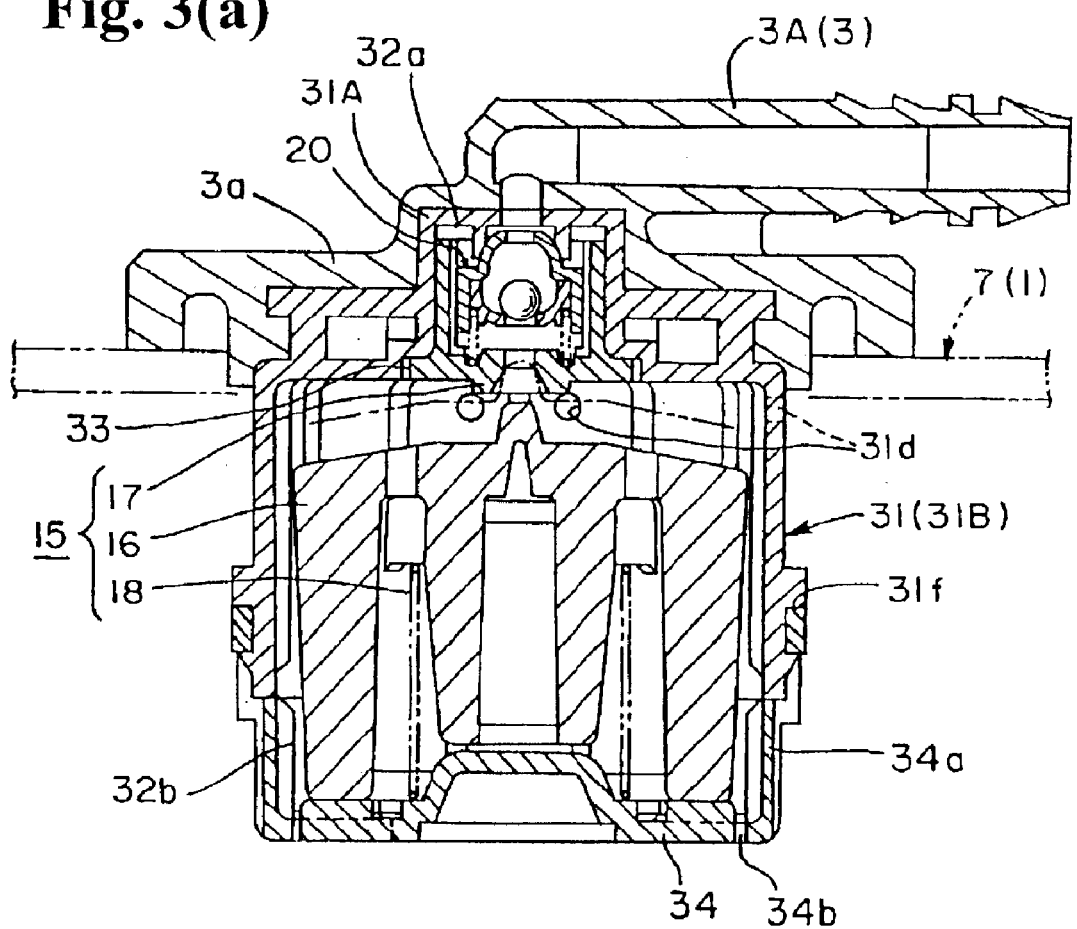
FIG. 3(a) is a vertical sectional view showing a valve device according to the second embodiment.
Figure 3B:
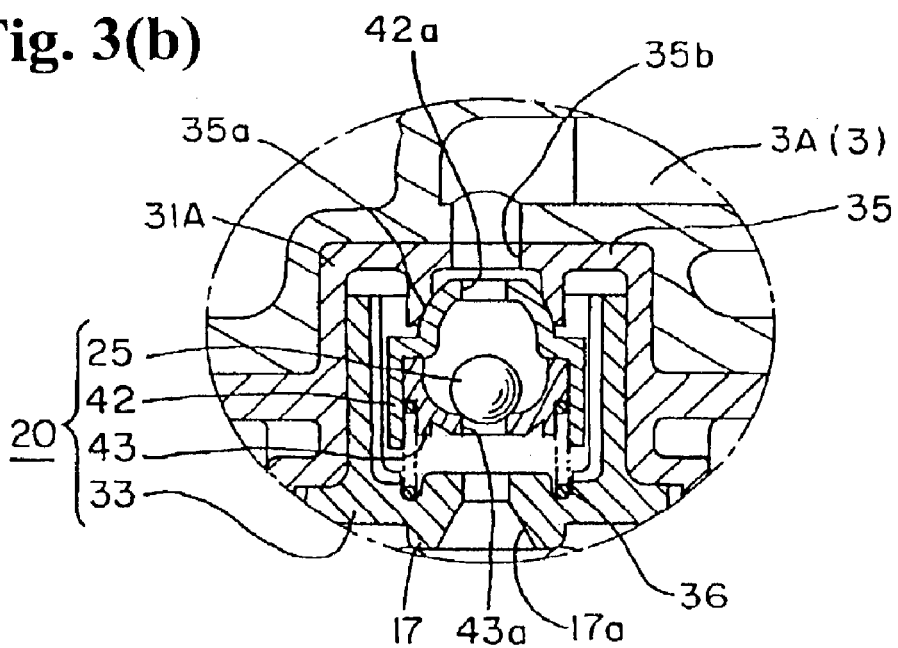
FIG. 3(b) is an enlarged view of the pressure control valve of the second embodiment.
Figure 4:
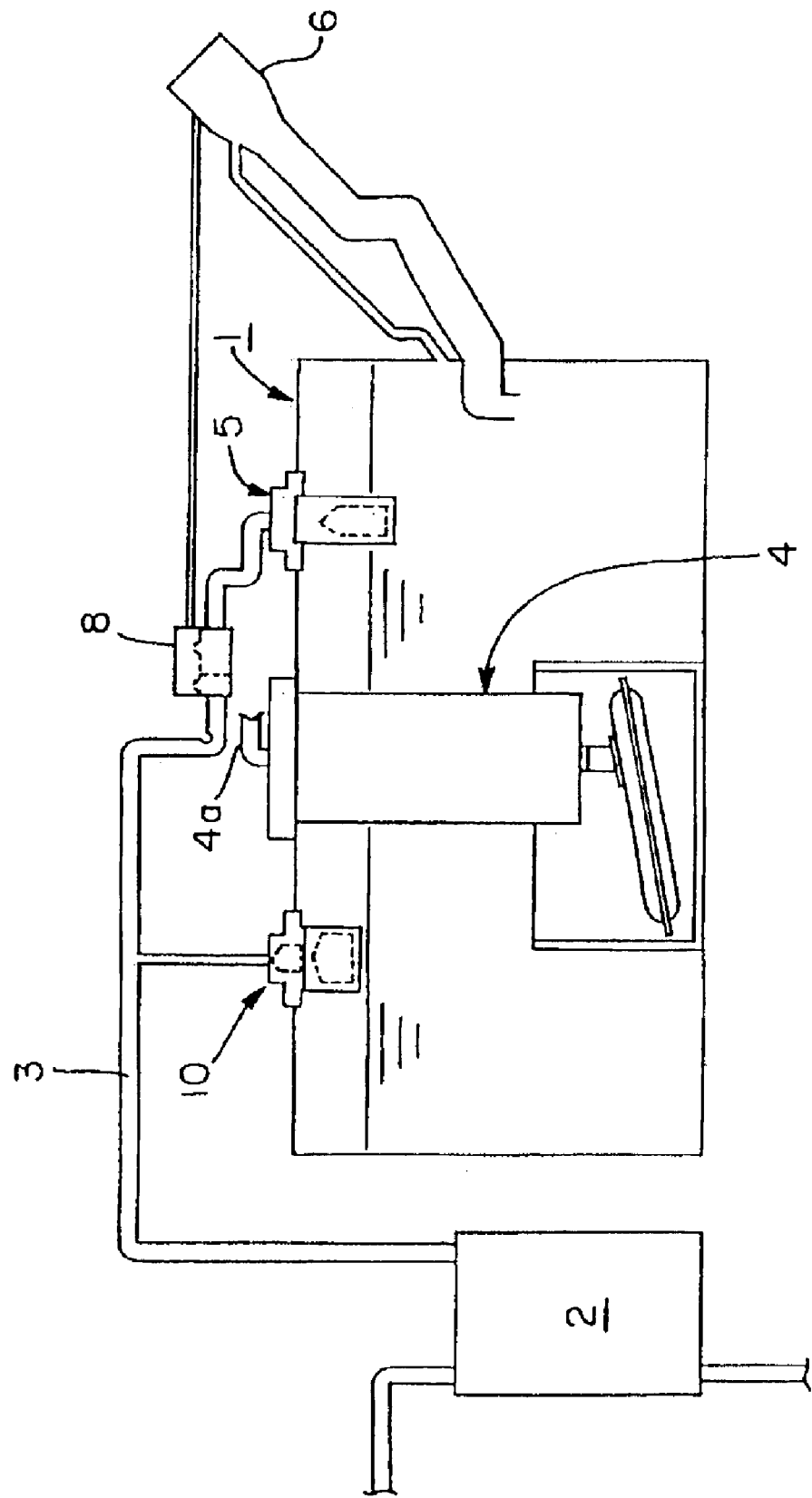
FIG. 4 is a schematic view showing a using state of the valve devices.
Figure 5:
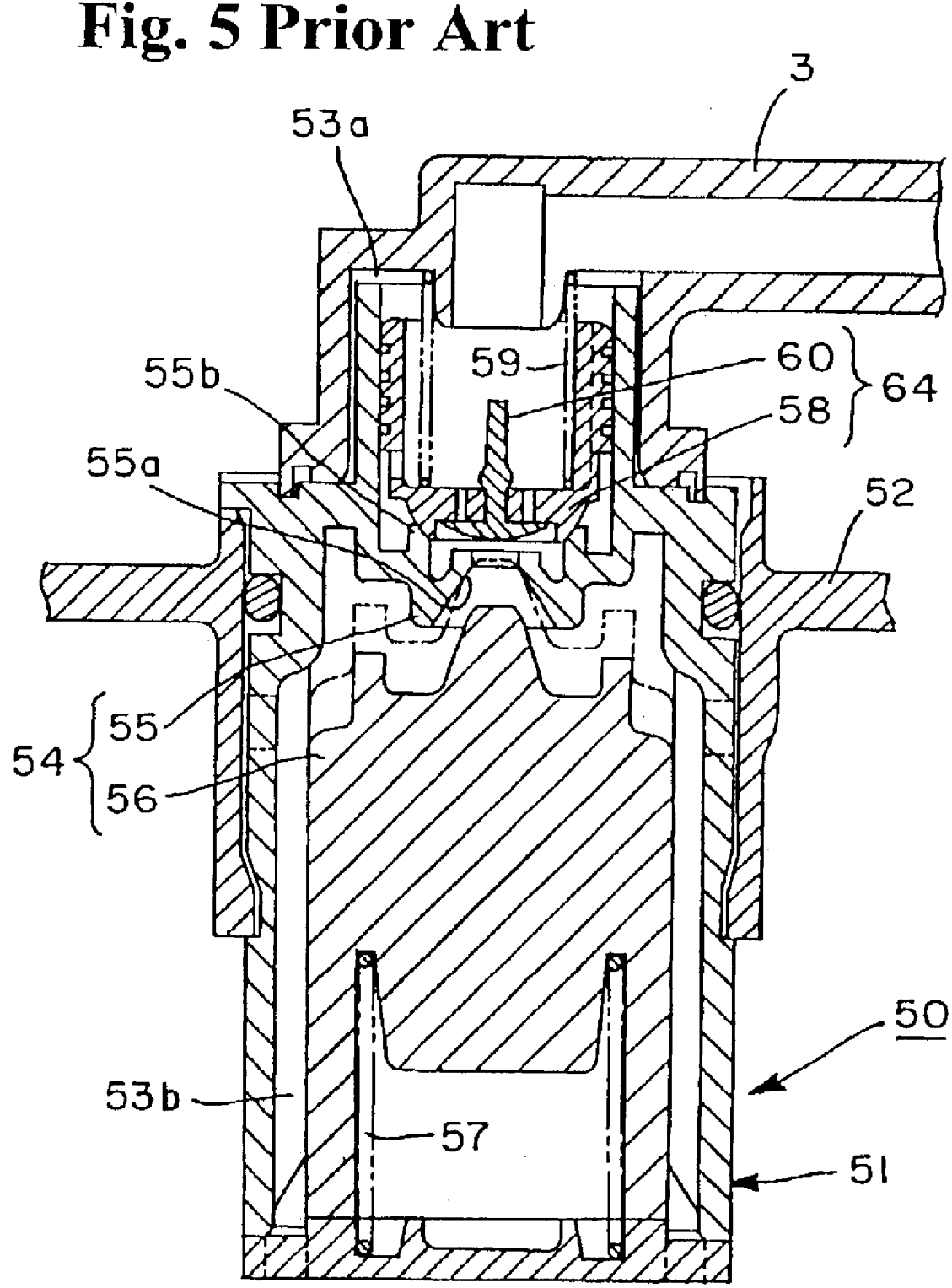
FIG. 5 is a sectional view of a conventional valve device.

Hereunder, embodiments of the present invention will be described with reference to the accompanying drawings. FIG. 1 and FIGS. 2(a), 2(b) are views showing the first embodiment; FIGS. 3(a), 3(b) are views showing the second embodiment; and FIG. 4 is a view showing a using state thereof.

In the following description, common elements relating to the first and second embodiments will be explained. Then, a structure and an operation of the first embodiment, and modified features as the second embodiment will be explained in this order. Incidentally, in order to omit duplicated explanations as much as possible, the same reference symbols are assigned to the same or similar members and portions in the drawings.

A fuel blocking valve device 10 (hereinafter, referred to simply as "valve device 10") of each embodiment is welded to an upper portion of a tank 1 through a supporting bracket 7. The valve device allows fuel vapor generated in the tank 1 due to a temperature change to pass through a piping 3 or 3A, and the fuel vapor is recovered at a canister 2. Also, when a vehicle turns over, the valve device prevents the fuel in the tank from leaking outside through the canister 2.

The respective embodiments have the following features in common. A housing is provided with a floating valve 15 at a lower side thereof, and a pressure control valve 20 as a two-way valve at an upper side thereof. A floating valve 15 is formed of a float type valve member 16 urged by a spring 18. The valve member 16 includes a spring allocation portion 16a.

In the pressure control valve 20, a positive pressure valve is formed of a ball 25 (spherical member). A valve member 22 of a negative pressure valve is urged by a spring 26 toward a closed position.

A supporting bracket, the housing and main valve members are mode of a resin. In addition to an example shown in FIG. 4, the valve device of the invention may be integrated with other instruments, such as a vent valve device 5, a differential pressure valve 8 and a canister 2, as a unit.

FIG. 1 is a vertical sectional view of the valve device attached to the supporting bracket 7. FIG. 2(a) is a view showing an appearance of the valve device; and FIG. 2(b) is a view showing an upper side of the valve device. The valve device 10 includes a cylindrical housing 11, a float valve 15 disposed in a lower chamber 12b of the cylindrical housing 11, and a pressure control valve 20 disposed in an upper chamber 12a of the cylindrical housing 11.

The housing 11 includes an upper portion 11A to be connected to an attaching portion 3a of the piping 3, a lower portion 11B to be located in the tank 1, and a partition wall 11C for partitioning between the upper chamber 12a and the lower chamber 12b. An upper lid 13 closes the upper portion 11A, a lower lid 14 closes the lower portion 11B, and a valve seat 17 of the float valve 15 is formed in the partition wall 11C.

Incidentally, the supporting bracket 7 is integrally formed with a holder portion 3A to be connected to the piping 3 and the attaching portion 3a to be attached to a corresponding surface of the tank 1. The attaching portion 3a is provided with engaging portions 7a for mounting an upper portion of the housing 11. A through hole 13b (described later) faces an opening of the holder portion 3A in a state where the supporting bracket 7 holds the housing 11. The supporting bracket 7 may be properly modified according to an upper shape of the housing 11 and a shape of the tank 1.

The lower portion 11B includes guide ribs provided in a vertical direction along an inner surface, a plurality of through-holes 11d provided on a peripheral thereof, a plurality (four) of engaging claws 11e projected from an upper periphery thereof, and a plurality (four) of fitting holes 11f formed in a lower periphery thereof. Also, the lower portion 11B is attached to the supporting bracket 7 in a state where the engaging claws 11e engage engaging holes 7b provided in the engaging portion 7a.

The lower lid 14 closes the lower portion 11B in a state that the valve member 16 constituting the float valve 15 is inserted into the lower chamber 12b together with the spring 18. In other words, when the valve member 16 is inserted into the lower chamber 12b with the spring 18 disposed in the spring disposing position 16a, the valve member 16 is assembled to be vertically movable with a space between the valve member and an inner surface of the chamber due to the guide ribs. The lower 11d 14 is provided with engaging portions 14a formed therearound and a plurality of through-holes 14b. The engaging portions 14a engage fitting holes 11f while compressing the spring 18 against the lower portion 11B, thereby attaching the lower lid 14. In the attached state, a valve portion projecting from a central upper surface of the valve member 16 faces a valve seat 17 formed at a central portion of the partition wall 11B with a space therebetween.

The valve seat 17 is provided with an inclined central hole (gas passing hole) 17a with a diameter gradually becoming smaller in an upward direction. When the fuel flows into the lower chamber 12b through the through-holes 14b, 11d, the valve member 16 is elevated with the auxiliary spring 18 to thereby enter the inclined central hole 17a, so that the float valve 15 moves from an open position to a closed position.

In the upper portion 11A, a negative pressure valve case as an upper case mounted on an upper opening is formed of a lower case 19 disposed in the upper chamber 12a and the upper lid 13. The pressure control valve 20 is disposed in the valve case. The lower case 19 has a substantially reversed cap shape, and a lower surface facing the partition wall 11C is widely opened. The upper lid 13 has a thick-walled portion at a center portion thereof, and the thick-walled portion is formed in a negative pressure valve seat 13a with a relatively large through hole 13b. Also, the upper portion 11A is provided with packing P at a peripheral groove disposed along an outer periphery thereof, and is attached to the engaging portion 7a of the supporting bracket 7 through the packing P in a tightly sealed condition.

The pressure control valve 20 includes a cylindrical valve member 22 vertically movable in the valve case partitioned by the lower case 19 and the upper lid 13; a valve seat 23 mounted to a lower opening of the valve member 22; and a ball 25 of a positive pressure valve to be disposed in a space formed by the valve member 22 and the valve seat 23. An upper portion of the valve member 22 is formed in a projected valve portion facing the valve seat 13a, and a through hole 22a is formed in the valve portion. The through hole 22a has a diameter slightly smaller than that of the through hole 13b of the valve seat 13a. A main portion of the valve seat 23 is formed in a cone-shape projecting downward with a through hole 23a at a center thereof. A peripheral edge of the valve seat 23 is mounted on a lower portion of the valve member 22 in a state that the ball 25 is placed in the valve member 22.

In this mounted state, the ball 25 as a valve member is provided in a space formed by the valve member 22 and the valve seat 23, and moves freely along an inner surface of the cone shape of the valve seat 23. Therefore, in the normal state, the valve member 22 is at the closed position wherein the ball 25 is situated at the central portion of the cone shape to close the through hole 23a.

Incidentally, in an assembling process, first, the valve member 22 as an integrated part with the ball 25 therein is installed in the lower case 19 mounted in the upper chamber 12a together with the spring 26. Then, the upper lid 13 is mounted on the upper end of the upper portion 11B while compressing the spring 26.

The valve device 10 is mounted to the tank 1 through the supporting bracket 7. In the mounted state, the pressure control valve 20 is in the closed position where the valve member 22 is elevated by the urging force of the spring 26 through the valve seat 23 and the projected valve portion enters the through hole 13b of the valve seat 13a (at this time, the ball 25 is located at the closed position). When the inner pressure of the tank 1 becomes a value below the designed value, the valve member 22 is lowered against the urging force of the spring 26 by a sucking force received through the housing 11 and the central hole 17a of the valve seat, so that the valve member 22 is in the open position for opening the through hole 13b of the valve seat 13a.

Thus, a communication path between the tank 1 and the piping 3 is formed through a holder portion 3A of the supporting bracket 7, the through hole 13b, a space between the valve member 22 and the lower case 19, the central hole 17a, the lower chamber 12b, and the through-holes 11d. Accordingly, air is introduced from the canister 2 through the path, thereby releasing the negative condition of the inner pressure in the tank 1. When the inner pressure in the tank 1 returns to the normal pressure, the valve member 22 is again shifted to the closed position by the urging force of the spring 26.

On the contrary, when the inner pressure of the tank 1 becomes higher than a designed value, the ball 25 moves by the pressure received through the central hole 17a of the valve seat 17 and the through hole 23a of the valve seat 23 to thereby open the through hole 23a. Thus, a communication path between the tank 1 and the piping 3 is formed through the through-holes 11d, the lower chamber 12b, the central hole 17a, the through hole 23a, the through hole 22a of the valve member 22 and the through hole 13b of the valve seat 13a. Accordingly, the fuel vapor in the tank can be recovered by the canister 2 via the piping 3 through the path. When the pressure in the tank returns to the normal value, the ball 25 returns to the original closed position.

Incidentally, the ball 25 is designed to move when the inner pressure, i.e. an opening pressure of the ball 25, becomes higher than a fuel head pressure of the fuel supply pipe 6 at the time when the fuel is filled up in the tank 1. To this end, a weight of the ball 25 and a curvature of the valve seat 23 are adjusted with an assumption of the vehicle running vibration (load calculated based on the design). Therefore, in the structure, the ball 25 does not move by the pressure in the tank 1 in the filled-up state, so that the through hole 23a is not opened.

In a state as shown in FIG. 1, when the vehicle turns over, the fuel enters the housing 11 through the through-holes 14b, 11d to fill up. Accordingly, the valve member 16 is floated to the upper limit with the urging force of the spring 18 to close the central hole (gas transmitting hole) 17a of the valve seat 17, and the valve member 16 stays at the closed position. Therefore, the fuel in the tank 1 does not flow out from the housing 11 through the holder portion 3A of the supporting bracket 7, the piping 3 and the canister 2, and further to the atmosphere. As a result, the float valve 15 prevents the fuel from leaking.

When the vehicle runs, vibrations with various magnitudes are applied to the valve device 10 (ball 25). Due to the vibrations, the ball 25 of the positive pressure valve moves in the cone shape of the valve seat 23. As a result, the ball 25 moves between the closed position for closing the through hole 23a as described above and the open position for opening the through hole 23a. When the through hole 23a is opened, air with the atmospheric pressure is introduced into the tank 1 from the canister 2 through the through hole 13b, the through hole 22a, the space partitioned by the valve member 22 and the valve seat 23, the through hole 23a, the central hole 17a, the lower chamber 12b and the through-holes 14b, 11d. As air is repeatedly introduced, the inner pressure of the tank 1 is maintained close to the atmospheric pressure. As a result, the positive pressure valve (ball 25 and valve seat 23) controls the inner pressure of the tank when the vehicle runs.

In the valve device 10, air enters into or flows out of the tank 1, so that the pressure in the tank 1 is constantly controlled close to the atmospheric pressure as much as possible. Therefore, the positive pressure valve controls the inner pressure of the tank when the vehicle runs, thereby greatly reducing the permeation of the fuel or the fuel vapor. Also, the valve is formed of the ball 25 and the valve seat 23, so that the control of the inner pressure is simplified and easily maintained. The valve member moves easily to the closed position due to the cone shape inner surface when the vehicle stops.

FIG. 3(a) is a vertical sectional view showing a valve device 10 according to the second embodiment, and FIG. 3(b) is an enlarged view of the pressure control valve 20. The valve device 10 operates in a way same as that of the first embodiment. A shape of the housing 31 and an alignment of the pressure control valve 20 are modified. More specifically, in the valve device 10, a floating valve 15 is disposed in a lower chamber 32b at a lower portion 31B of the housing 31, and the pressure control valve 20 is disposed in an upper chamber 32a at the upper portion 31A of the housing 31. A connecting holder 3A (corresponding to the holder portion 3A of the above-mentioned supporting bracket 7) to be connected to the piping 3 by the die forming is formed by the insert molding.

With this configuration, the housing 31 is not integrated with the partition wall 11C shown in the first embodiment. The housing 31 is provided with a case 33 as a valve seat of the floating valve 15 as well as a valve case of the pressure control valve 20. An end surface 35 corresponding to the upper lid 13 in the first embodiment is integrally formed as shown in FIG. 3(b). In other words, the case 33 has a shape combining the partition wall 11C and the lower case 19 in the first embodiment, and is fixed by the ultrasonic welding in a state that the case 33 is inserted into the upper chamber 32a. A lower portion of the case 33 corresponds to the valve seat 17, and is provided with an inclined central hole (gas transmitting hole) 17a with a diameter gradually decreasing upward.

The lower portion 31B includes guide ribs extending in the vertical direction along an inner surface thereof, a plurality of through-holes 31d disposed on a periphery thereof, and fitting grooves 31f provided on a lower periphery thereof. The lower portion 31B is attached to the supporting bracket 7 by welding or the like. In the attached state, the through-holes 31d located at an upper periphery are communicated with the inside of the tank 1. The valve member 16 is inserted in the lower chamber 32b together with the spring 18 in the same manner as in the first embodiment, and a lower lid 34 closes a bottom of the lower chamber 32b.

The lower lid 34 is provided with a retainer member 34a at a periphery thereof, and a plurality of the through-holes 34b. A front claw of the retainer member 34a engages a fitting groove 31f while compressing the spring 18 against the lower portion 31B, thereby attaching the lower lid 34. In the attached state, a valve portion of the valve member 16 projecting at a center of an upper surface faces the valve seat 17 formed on the case 33 with a space in between. The valve member 16 is elevated with the spring 18 to enter the central hole 17a when the fuel flows into the lower chamber 32b through the through-holes 34b, 31d, so that the floating valve 15 moves from an open position to a closed position.

In the upper portion 31A, a valve case is formed of the case 33 and the end surface 35, and the pressure control valve 20 is disposed in the valve case. The end surface 35 has a recessed portion at an inner side thereof, and the recessed portion is formed in a valve seat 35a for the negative pressure valve. The valve seat 35a is provided with a through hole 35b, so that the through hole 35b faces an opening of the connecting holder 3A (piping 3).

The pressure control valve 20 includes a cylindrical valve member 42 to be vertically movable in the valve case formed of the case 33 and the end surface 35; the valve seat 43 attached to a lower opening of the valve member 42; and the ball 25 disposed in a space formed by the valve member 42 and the valve seat 43. The valve member 42 includes a projected valve portion on the upper side thereof so as to face the valve seat 35a, and the valve portion is provided with a through hole 42a. The through hole 42a has a diameter slightly smaller than that of the through hole 35b of the valve member 35a.

A main portion of the valve seat 43 is formed in a cone shape projecting downward, and is provided with a through hole 43a at the center thereof. A peripheral edge of the valve seat 43 is integrated with a lower side of the valve member 42 by welding in a state that the ball 25 is placed in the valve member 42. In the attached state, the ball 25 is placed in the space formed by the valve member 42 and the valve seat 43, so that the ball 25 moves along an inner surface of the cone shape portion of the valve seat 43. In the normal state, the ball 25 stays at the center of the cone shape portion to close the through hole 43a.

Incidentally, in the assembling process, an integrated unit including the ball 25 therein is disposed in the upper chamber 32a together with the spring 36, and the case 33 is then inserted while compressing the spring 36.

The valve device 10 as described above operates in a way same as that of the first embodiment in the state that the valve device 10 is mounted through the supporting bracket 7. First, the pressure control valve 20 is in the closed position (at this time, the ball 25 is located in the closed position) when the valve member 42 is elevated by the urging force of the spring 36 and enters the through hole 35b of the valve seat 35a. When the inner pressure of the tank 1 becomes a level below the designed value, the valve member 42 is lowered against the urging force of the spring 36 by the suction force received through the interior of the housing 1 and the central hole 17a, and shifted to the open position to open the through hole 35b. Accordingly, a communication path between the interior of the tank 1 and the connecting holder 3A (piping 3) is formed through the through hole 35b, a space between the valve member 42 and the case 33, the central hole 17a, the lower chamber 32b, and the through-holes 31d. Therefore, air is introduced through the path from the canister 2, thereby releasing the negative pressure state of the tank 1. When the inner pressure returns to the normal, the valve member moves to the closed position with the spring 36.

On the contrary, when the inner pressure of the tank 1 becomes higher than a designed value, the pressure received through the central hole 17a and the through hole 43a of the valve seat 43 pushes the ball 25 to open the through hole 43a. Accordingly, a communication path between the interior of the tank 1 and the holder 3A (piping 3) is formed through the through-holes 31d, the lower chamber 32b, the central hole 17a, the through hole 43a, the through hole 42a of the valve member 42 and the through hole 43b of the valve seat 43a. Therefore, the canister 2 recovers the fuel vapor from the tank through the path and the holder 3A (piping 3). When the inner pressure in the tank 1 returns to the normal pressure, the ball 25 returns to the closed position.

Other details in the operation of the second embodiment are the same as those of the first embodiment. When the vehicle turns over, the fuel flows in the housing 31 through the through-holes 34b, 31d to fill up. The valve member 16 is floated to the upper limit position with the urging force of the spring 18, and closes the central hole 17a of the valve seat 17. Therefore, the fuel in the tank 1 does not flow out from the housing 31 to the atmosphere through the holder 3A (piping 3) and the canister 2.

When the vehicle runs, the various vibrations are applied to the valve device 10 (ball 25). Due to the vibrations, the ball 25 of the positive pressure valve moves along the cone shape portion of the valve seat 43, and moves between the closed position and the open position for closing and opening the through holes 43a.

When the through hole 43a is opened, air of the atmospheric pressure is introduced from the canister 2 into the tank 1 through the communication path including the through hole 35b, the through hole 42a, the space formed by the valve member 42 and the valve seat 43, the through hole 43a, the central hole 17a, the lower chamber 32b, and the through-holes 34b, 31b. Air is repeatedly introduced to maintain the inner pressure of the tank 1 close to the atmospheric pressure as much as possible. Therefore, in the valve device 10 of the second embodiment, the advantages described in the first embodiment can be obtained. The present invention can be modified in various manners within a scope of the subject matters specified in the claims.

As described hereinabove, in the fuel blocking valve device according to the present invention, the pressure in the fuel tank is maintained close to the atmospheric pressure as much as possible through the opening-closing of the positive pressure valve. Therefore, the permeation of the fuel or fuel vapor can be sufficiently reduced as compared with the prior art. Also, the structure of the valve device is simplified and the smooth operation is maintained as compared with the prior art.

While the invention has been explained with reference to the specific embodiments of the invention, the explanation is illustrative and the invention is limited only by the appended claims.

What is claimed is:

1. A fuel blocking valve device, comprising:

a housing to be attached to a fuel tank of a vehicle and having a communication path therein and an upper valve seat inside the housing with a first through hole at a top thereof, a float valve disposed in the housing for closing the communication path when fuel in the fuel tank flows into the housing, and a two-way valve disposed in the housing above the float valve for closing the communication path according to an inner pressure of the fuel tank, said two-way valve including a first valve portion disposed at a lower portion thereof for opening the communication path when the vehicle vibrates in a predetermined magnitude, and a second valve portion disposed inside the housing above the first valve portion and having a valve member with a second through hole urged to the upper valve seat for opening and closing the first through hole.

2. A fuel blocking valve device as claimed in claim 1, wherein said first valve portion is a positive valve for opening the communication path when the inner pressure of the fuel tank becomes a predetermined high level, and is formed of a cone shape valve seat, and a spherical member disposed on the cone shape valve seat, said first valve portion opening the communication path when the spherical member rotates.

3. A fuel blocking valve device as claimed in claim 2, wherein said second valve portion is a negative valve for opening the communication path when the inner pressure of the fuel tank becomes below a predetermined low level, said valve member being integrated with the valve seat of the first valve portion to have a space therein, in which said spherical member is disposed.

4. A fuel blocking valve device as claimed in claim 3, wherein said two-way valve is vertically movably located in the housing above the float valve, and the second valve portion is formed in a hollow body having the valve member with the second through hole at a top thereof, said spherical member being disposed in the hollow member.

5. A fuel blocking valve device as claimed in claim 4, wherein said two-way valve further includes urging means situated under the hollow member for urging the same upward.

6. A fuel blocking valve device as claimed in claim 1, wherein said first valve portion is arranged to open the communication path when the inner pressure of the fuel tank exceeds a level higher than a fuel head pressure in a fuel supply pipe when the fuel tank is filled up.

7. A fuel blocking valve device as claimed in claim 1, wherein said housing includes an upper portion for receiving the two-way valve, a lower portion for receiving the float valve, a partition wall for partitioning the upper and lower portions, and an upper lid attached to the upper portion and having said upper valve seat with the first through hole.

8. A fuel blocking valve device as claimed in claim 7, further comprising a supporting bracket, and a holder portion adapted to be attached to a piping and connected to the supporting bracket to communicate with the first through hole, said supporting bracket having a structure such that the housing is assembled to the supporting bracket from a lower side thereof.

* * * * *